United States Patent [19]

Alexander

[11] 4,108,772

[45] Aug. 22, 1978

[54] SLUDGE DISINFECTION

[75] Inventor: Samuel Ray Alexander, Houston, Tex.

[73] Assignee: E. I. Du Pont de Nemours and Company, Wilmington, Del.

[21] Appl. No.: 764,581

[22] Filed: Feb. 1, 1977

Related U.S. Application Data

[63] Continuation-in-part of Ser. No. 672,034, Mar. 30, 1976, abandoned.

[51] Int. Cl.$^2$ ............................................. C02B 3/10
[52] U.S. Cl. .......................................... 210/64; 210/10
[58] Field of Search ..................... 210/10, 51, 18, 59, 210/64

[56] References Cited

U.S. PATENT DOCUMENTS

| 3,163,598 | 12/1964 | Yoshihara et al. | 210/51 |
| 3,183,186 | 5/1965 | Oster | 210/52 |
| 3,377,271 | 4/1968 | Conn | 210/10 |
| 3,642,619 | 2/1972 | Lo Sasso et al. | 210/10 |

FOREIGN PATENT DOCUMENTS 50-56061  5/1975  Japan ......................................... 210/10

*Primary Examiner*—Thomas G. Wyse

[57] ABSTRACT

Disinfection and flocculation of waste activated sludge from a bio-oxidation facility is achieved by contacting the activated sludge with zinc salts optionally in the presence of manganese salts. Either simultaneously with the addition of the zinc or after the addition, sufficient base must be added to render the solution basic.

2 Claims, No Drawings

SLUDGE DISINFECTION

CROSS-REFERENCE TO RELATED APPLICATION

This application is a continuation-in-part of my copending application Ser. No. 672,034, filed Mar. 30, 1976 now abandoned.

BACKGROUND OF THE INVENTION

Treatment of biological sludge and the ultimate disposal of such sludge are a major problem in wastewater treatment. A large amount of biological sludge is produced by the various bio-oxidation facilities which exist around the world. It is necessary to kill the bacteria within the sludge to eliminate the noxious odors and health hazards which they produce. It is also essential to reduce the sludge in volume to expedite disposal. This is quite important since the sludge is likely to become a health hazard. Typically, processes such as anaerobic digestion, aerobic digestion, and incineration have been used for sludge treatment. Processes such as these are, however, quite expensive and are not always effective.

Thus a method for disinfecting and flocculating waste-activated sludge which is relatively inexpensive and efficient, is needed.

SUMMARY OF THE INVENTION

According to this invention, it has unexpectedly been found that activated sludge may be disinfected, that is to say, the bacteria within the sludge may be destroyed, by adding to the sludge an effective amount of a zinc salt, preferably zinc chloride. Optionally, manganese may also be added to the sludge. To flocculate the zinc-containing sludge stream, a basic pH is necessary. This is accomplished by adding a base to the sludge either concurrently with or after the zinc has been added.

In any event, by raising the basicity of the sludge, the zinc will settle out as zinc hydroxide and flocculation of the biological sludge will be expedited.

DETAILED DESCRIPTION OF THE INVENTION

This invention provides a method of disinfecting and flocculating waste biological sludge by mixing such sludge with zinc salts and flocculating in a basic solution. The base may be added along with the zinc salt or after the zinc salt has been added to the sludge. Optionally, manganese salts may be added in conjunction with the zinc.

Suitable biological sludges which may be treated by the method of this invention can be characterized by their volatile suspended solids (VSS) and total suspended solids (TSS). There is, however, no intention to limit the sludges which may be treated by the method of this invention. Sludges will have a VSS value of at least 4,000; typically, the VSS value of the sludge will vary from about 4,000–15,000 parts per million (PPM) with many sludge falling within 7,000–10,000 PPM. The TSS value can vary typically, from 8,000–30,000 PPM, with more usual values of 10,000–20,000 PPM. A substantial portion of the suspended solids in the sludge are living microorganisms.

A ready source of the sludge to be treated is a clarifier's underflow. Such clarifiers are common in secondary treatment plants for handling industrial and municipal wastes.

Suitable zinc salts are those forming zinc-hydroxide in basic solutions. A commonly available source is zinc halide such as $ZnCl_2$; other zinc salts include $ZnSO_4$, $Zn(NO_3)_2.3H_2O$, $ZnCr_2O_7.3H_2O$, zinc carbonate or zinc hydroxide. Organic zinc salts may also be used.

Zinc is also a common processing metal and appears in numerous waste streams. Such waste streams can provide the necessary zinc salt for use in this invention.

Treatment of the sludge with zinc salt with resulting flocculation of the disinfected sludge and zinc hydroxide is achieved in a preferred embodiment of this invention by mixing the sludge and zinc salt under basic conditions. Desirable basic conditions will include a pH of about 10 to 11 with a most preferred pH of about 10 to 10.5. The basicity can be achieved by adding a strong alkali, preferably sodium hydroxide. Other bases which can be used include KOH, $Li(OH_2)$ etc. If present, manganese would be in the form of a salt, such as the sulfate, the hydroxide, etc. or even an organic salt.

In another preferred embodiment, the zinc salt, optional manganese salt, and sludge are mixed at a pH below 7.5 followed by adjustment to a higher ph, e.g. 10–11 pH. The higher pH causes formation and flocculation of the zinc hydroxide.

The initial mixture ratio of zinc to TSS is usually between 80 PPM/10,000 PPM and 160 PPM/10,000 PPM, more usually between 100 PPM/10,000 PPM and 130 PPM/10,000 PPM. The ratio may, however, be much broader and one skilled in the art will be able to readily determine the proper ratio for a given sludge stream.

Contacting of the zinc and sludge can be achieved by any of the conventional mixing techniques, e.g., a high-speed mixer. The mixing causes penetration of the sludge by the zinc. For most methods of mixing, a hold-up time of about 15 minutes is adequate.

Flocculation is carried out in conventional clarification equipment. This invention is especially suitable for use with a settling lagoon. The suitable clarification hold-up time is dictated by the flocculation rate.

Example 1 compares the settling rates and stability of the following solutions. Relative stability numbers are found in standard tests such as *The Manual of Instruction for Treatment Plant Operators*, prepared by N.Y. State Dept. of Health, pages 130–131.

Solutions a. 10,000 PPM untreated sludge (control sample)
b. 10,000 PPM sludge with 160 PPM Zn
c. 50% sludge with 50% industrial waste
d. 17% sludge with 83% industrial waste The sludge used for all solutions is typical of the Gulf Coast Waste Disposal Authority secondary treatment plant located in Bayport, Texas.

EXAMPLE 1

Preparation

Solution a 600 ml of 10,000 PPM TSS sludge is placed in a 1000 ml beaker

Solution b

To a 1000 ml beaker containing 600 ml of 10,000 PPM TSS sludge is added 0.2 grams $ZnCl_2$.

Solution c

To a 1000 ml beaker containing 300 ml of 10,000 PPM TSS sludge is added 300 ml of a typical waste stream with 80 PPM zinc and a total TSS of 10,000 PPM.

Solution d

To a 1000 ml beaker containing 100 ml of 10,000 PPM TSS sludge is added 500 ml of a typical waste stream with 150 PPM zinc and a total TSS of 10,000 PPM.

The pH of the solutions is then raised from 8 to 10.5 by adding NaOH while stirring. Stirring is continued until the solutions are uniform. A 100 ml portion of each solution is separately placed in a 100 ml graduated cylinder for a settling test, and a 300 ml portion of each solution is placed in a 400 ml beaker for a stability test.

The settling test consists of recording the level of the sludge blanket in each solution as time elapses. The settling test indicates the ease with which the solid materials, i.e., sludge, will concentrate or settle out. As a control, 100 ml of the same sludge was stirred and placed in a 100 ml graduated cylinder and its settling recorded. The results are shown in the following table.

TABLE

SETTLING RATE AND SLUDGE VOLUME
(sludge volume, ml/100 ml after settling)

| Treatment | Time (hrs.) | | | | | |
|---|---|---|---|---|---|---|
| | 0.16 | 1 | 2 | 4 | 5 | 20 |
| a. untreated (control) | | | 93 | 93 | | 84 |
| c. sludge + industrial waste (1:1) | 96 | 92 | | 80 | 64 | 34 |
| d. sludge + industrial waste (1:5) | 75 | 30 | 25 | | | |
| b. sludge + 160 ppm ZnCl$_2$ | 93 | 60 | 42 | | | 20 |

The 300 ml portion of Solution C was adjusted to pH 7 by addition of HCl. Two ml of methylene blue solution (10 grams per liter) were then added to one 125 ml portion taken from each of the two 300 ml solutions, and the portions were then placed in separate bottles and stoppered so that no air was in contact with the liquid.

The blue colored solution is stable unless the solution loses its color within a specified period of time. Percent stability is an indication of the probability that the microorganisms in the solutions are dead.

The results were as follows:

| RELATIVE STABILITY | | |
|---|---|---|
| | Solution | % Stable |
| a. | untreated | 21% |
| b. | sludge and ZnCl$_2$ (160 ppm Zn) | 99% |
| c. | sludge and industrial waste (1:1) | 99% |
| d. | sludge and industrial waste (1:5) | 99% |

EXAMPLE 2

A typical industrial secondary treatment plant generates excess activated sludge, which can be disposed of in the following manner:

Average flow of waste to the treatment plant is 3,860 liters/min with a clarifier underflow of sludge averaging 1,240 liters/min. Of this underflow, 1,140 liters/min of sludge is recycled to aeration basins and 100 liters/min of sludge with an average TSS of 12,000 PPM is purged as excess sludge. The excess sludge is mixed with an industrial waste stream containing zinc salts, ZnCl$_2$, and Zn(OH)$_2$ for disinfection and flocculation. The waste stream is mixed at a rate to give a minimum of 80 PPM zinc per 10,000 PPM sludge. Manganese salts are also present as the hydroxide and organic salts.

The treated stream is discharged into a 72 million liters lagoon maintained at a pH of 10.5 by addition of sodium hydroxide. The sludge and zinc settle in the lagoon and the supernatant is recycled to the front of the treatment plant.

What is claimed is:

1. A method of disinfecting biological sludge, said sludge having a TSS value between about 8,000 and 30,000 ppm and a VSS value between about 4,000 and 15,000 ppm, comprising contacting said sludge with a stabilizing amount of zinc and adjusting the basicity of the zinc/sludge mixture to a pH of about 10 to 11.

2. The method of claim 1 wherein manganese is added in conjunction with the zinc.

* * * * *